US009286585B2

(12) United States Patent
DiMarco et al.

(10) Patent No.: US 9,286,585 B2
(45) Date of Patent: Mar. 15, 2016

(54) AUTOMATED DATA-DRIVEN CLOSED-LOOP-FEEDBACK METHOD FOR ADAPTIVE AND COMPARATIVE QUALITY CONTROL IN A DISCRETE DATA AGGREGATION ENVIRONMENT

(71) Applicant: International Business Machines Corporation, Armonk, NY (US)

(72) Inventors: Robert A DiMarco, Wappingers Falls, NY (US); Vincent J Giancaspro, Wappingers Falls, NY (US); Michael J Whitney, Cary, NC (US); Feng Xue, Singapore (SG); Jung H Yoon, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 554 days.

(21) Appl. No.: 13/661,400

(22) Filed: Oct. 26, 2012

(65) Prior Publication Data

US 2014/0121805 A1     May 1, 2014

(51) Int. Cl.
*G06Q 10/00*     (2012.01)
*G06Q 10/06*     (2012.01)
*G06Q 30/00*     (2012.01)

(52) U.S. Cl.
CPC .......... *G06Q 10/06* (2013.01); *G06Q 10/06395* (2013.01); *G06Q 10/00* (2013.01); *G06Q 30/00* (2013.01)

(58) Field of Classification Search
CPC ........ G06F 19/00; G06Q 10/00; G06Q 10/06; G06Q 10/06395; G06Q 30/00
USPC .................................. 700/109, 110; 705/7.41
See application file for complete search history.

(56) References Cited

U.S. PATENT DOCUMENTS

| 4,992,940 A | * | 2/1991 | Dworkin ....................... 705/26.8 |
| 5,150,289 A |   | 9/1992 | Badavas |
| 6,574,522 B1 |  | 6/2003 | Douglas |
| 6,785,623 B2 | * | 8/2004 | Higgins .......................... 702/81 |
| 6,922,684 B1 | * | 7/2005 | Aldridge .................. G06N 5/04 706/45 |

(Continued)

OTHER PUBLICATIONS

Saurez Bello, Marlene., "A Case Study Approach to the Supplier Selection Process", University of Puerto Rico, 2003, pp. 1-142.*

(Continued)

*Primary Examiner* — Carlos Ortiz Rodriguez
*Assistant Examiner* — Jennifer L Norton
(74) *Attorney, Agent, or Firm* — Kunzler Law Group

(57) ABSTRACT

A method for determining quality includes receiving supplier quality data from a supplier. The supplier quality data includes discrete quality data. The supplier quality data is for a quantity of a component supplied to a company or for a service provided on behalf of the company over a supplier measurement period. The method includes aggregating quality data from two or more suppliers. The quality data is for the supplied component or provided service over a baseline time period. The method includes determining a quality benchmark using the aggregated quality data and setting one or more alarm levels. The alarm levels are based on the quality benchmark of the aggregated quality data. The method includes determining supplier quality level for the supplier for the supplier measurement time period. The supplier quality is based on the supplier quality data. The method includes determining if the supplier quality data exceeds an alarm level.

12 Claims, 8 Drawing Sheets

(56) References Cited

U.S. PATENT DOCUMENTS

| | | | |
|---|---|---|---|
| 7,324,862 B2 | 1/2008 | Sugihara et al. | |
| 7,593,871 B1* | 9/2009 | Mesaros | 705/26.2 |
| 7,610,168 B2* | 10/2009 | Isumi et al. | 702/179 |
| 8,214,238 B1* | 7/2012 | Fairfield et al. | 705/7.11 |
| 8,255,269 B1* | 8/2012 | Aued | 705/7.35 |
| 8,290,824 B1* | 10/2012 | Mesaros | 705/26.2 |
| 8,886,588 B2* | 11/2014 | Carson | G06Q 10/10 706/47 |
| 2002/0065762 A1* | 5/2002 | Lee et al. | 705/37 |
| 2002/0069079 A1* | 6/2002 | Vega | 705/1 |
| 2002/0080950 A1* | 6/2002 | Koko et al. | 379/265.06 |
| 2004/0122625 A1* | 6/2004 | Nasser et al. | 702/185 |
| 2004/0210335 A1* | 10/2004 | Chandra et al. | 700/109 |
| 2005/0065842 A1* | 3/2005 | Summers | 705/11 |
| 2006/0178918 A1* | 8/2006 | Mikurak | 705/7 |
| 2008/0079598 A1* | 4/2008 | Bibelhausen et al. | 340/683 |
| 2008/0228305 A1* | 9/2008 | Wang et al. | 700/109 |
| 2009/0144070 A1* | 6/2009 | Psota et al. | 705/1 |
| 2011/0055205 A1 | 3/2011 | Scott et al. | |
| 2012/0078410 A1* | 3/2012 | Wong et al. | 700/110 |
| 2015/0019291 A1* | 1/2015 | Gershenson | G06Q 30/0203 705/7.32 |

OTHER PUBLICATIONS

Microhttp://www.microstrategy.com/Download/files/Solutions/byDepartment/Supply_Chain/Quality_Control.pdf, Quality Control, MicroStrategy: Best in Business Intelligence, http://www.microstrategy.com/bi-applications/appsbook.asp, p. 73, retrieved: Feb. 9, 2012.

www.wiley.com/college/sc/reid/chap6.pdf, What is Statistical Quality Control?, Chapter 6-Statistical Quality Control, p. 172-173, Last retrieved: Jun. 6, 2012.

* cited by examiner

600 ↘

| Level | Alarm Level 1 Target | Alarm Level 2 Limit | Alarm Level 3 Alert |
|---|---|---|---|
| Definition | 1 x Baseline $Q(G, T_B)$ | 2 x Baseline | 3 x Baseline |
| Trigger Timing Owner: Supplier Quality Engineer | Monthly QMS Refresh SQE Initiated | Monthly QMS Refresh SQE Initiated | Monthly QMS Refresh SQE Initiated |
| Over-target Action: Supplier Owner: Supplier Owner | Send to supplier Ask for improvement | Send to supplier Response required 1 week turn around time | Send to supplier Response required 1 day turn around time |
| Over-target Action: Department Owner: Supplier Owner | Monthly team review | Bimonthly team review | Daily / As Required |
| Over-target Action: Management Owner: Supplier Owner | None | Monthly management review (line item) | Weekly management review (presentation page) + as reqd. |
| Over-target Action: Quality Team Owner: SQE | None | Monthly SPQL report (line item) Hi-vol only + weekly status update (verbal/as required) | Monthly SPQL report (presentation page) Hi-vol only + weekly status update (line item) |

| Month | Supplr | Density | Usage | Fails | PPM | Target L2 | Target L3 | Performance | Volume |
|---|---|---|---|---|---|---|---|---|---|
| 7 | B | 4G | 4,965 | 7 | 1,410 | 1,200 | 1,600 | 2 | Mid |
|   | C | 2G | 3,173 | 5 | 1,576 | 1,125 | 1,500 | 3 | Mid |
| 6 | C | 4G | 3,001 | 6 | 1,999 | 1,200 | 1,600 | 3 | Mid |
|   | D | 4G | 4,155 | 5 | 1,203 | 1,200 | 1,600 | 2 | Mid |
| 5 | B | 4G | 8,977 | 15 | 1,671 | 1,200 | 1,600 | 3 | Mid |
|   | C | 512M | 7,215 | 4 | 544 | 525 | 700 | 2 | Mid |
|   | D | 1G | 15,342 | 14 | 913 | 825 | 1,100 | 2 | High |
| 4 | B | 4G | 16,270 | 22 | 1,352 | 1,200 | 1,600 | 2 | High |
| 2 | B | 512M | 8,126 | 5 | 615 | 600 | 800 | 2 | High |
|   | C | 512M | 6,485 | 4 | 617 | 600 | 800 | 2 | Mid |

FIG. 7

AUTOMATED DATA-DRIVEN CLOSED-LOOP-FEEDBACK METHOD FOR ADAPTIVE AND COMPARATIVE QUALITY CONTROL IN A DISCRETE DATA AGGREGATION ENVIRONMENT

BACKGROUND

1. Field

The subject matter disclosed herein relates to quality data and more particularly relates to discrete supplier quality data.

2. Description of the Related Art

Often companies that do in-house manufacturing use sophisticated quality analysis to determine if quality of a component or service is adequate or needs improvement. The company may use six-sigma control charts and other tools to analyze quality. When a company outsources manufacturing, suppliers may also use sophisticated quality analysis internally, but often supply discrete quality data to the company along with components supplied to the company or with service provided over a particular time period on behalf of the company.

BRIEF SUMMARY

A method for determining quality is disclosed. An apparatus and computer program product also perform the functions of the method. The method includes receiving supplier quality data from a supplier. The supplier quality data includes discrete quality data. The supplier quality data is for a quantity of a component supplied to a company from the supplier over a supplier measurement period or for a service provided on behalf of the company over a supplier measurement period. The method includes aggregating quality data from two or more suppliers. The quality data is for the component supplied to the company or service provided for the company over a baseline time period. The quality data includes discrete quality data. The method includes determining a quality benchmark using the aggregated quality data and setting one or more alarm levels. The alarm levels are based on the quality benchmark of the aggregated quality data. The method includes determining a supplier quality level for the supplier for the supplier measurement time period. The supplier quality level is based on the supplier quality data. The method includes determining if the supplier quality level exceeds an alarm level.

In one embodiment, the aggregated quality data and the supplier quality data include data for a component and include a number of components tested and a number of components within the tested components failing a quality test. The data correlated to a time period relevant to creation of the components. In another embodiment, the aggregated quality data and the supplier quality data include data for a service provided by the supplier and include a quality score for the provided service. The quality score is for service provided by each supplier is based on a same scoring system.

In one embodiment, the quality benchmark includes a ratio of a quantity of component failures to a quantity of components tested within the baseline time period for the aggregated quality data or an average score of service provided by the suppliers within the baseline time period. The average score is based on the aggregate quality data. In another embodiment, the supplier quality data and the aggregated quality data include data for a group. The group includes a subclass of a class that includes the component or service. The quality benchmark, the one or more alarm levels, and the one or more supplier alarm levels are based on quality data for the group.

In another embodiment, aggregating the quality data includes summing component failures of the two or more suppliers over the baseline time period and summing a quantity of components tested by the two or more suppliers over the baseline time period. In another embodiment, aggregating the quality data includes summing averages scores for a service provided by the two or more suppliers over the baseline time period and dividing the sum by the number of suppliers. In another embodiment, setting the one or more alarm levels includes multiplying the quality benchmark by one or more alarm multipliers where each alarm multiplier is associated with an alarm level.

In one embodiment, determining a supplier quality level for the supplier includes determining a ratio of a quantity of component failures to a quantity of components tested. The quantity of component failures and the quantity of components tested are within in the supplier quality data for the supplier measurement period. In another embodiment, the method includes initiating an alarm response in response to determining that the supplier quality level exceeds a supplier alarm level. In a further embodiment, the one or more supplier alarms include alarms set at differing levels from the quality benchmark and the alarm response module initiates alarm responses of differing severity for each of the two or more alarms such that an alarm response of higher severity is associated with an alarm level further away from the quality benchmark and an alarm response of lower severity is associated with an alarm level closer to the quality benchmark than the alarm level with a higher severity alarm response.

In one embodiment, the method includes adding supplier quality data to the aggregated quality data to get updated aggregated quality data, determining an updated quality benchmark using the updated aggregated quality data, and setting one or more alarm levels based on the updated quality benchmark.

An apparatus for determining quality includes a receiver module that receives supplier quality data from a supplier. The supplier quality data includes discrete quality data. The supplier quality data is for a quantity of a component supplied to a company from the supplier over a supplier measurement period or a service provided on behalf of the company over a supplier measurement period. The apparatus includes an aggregation module that aggregates quality data from two or more suppliers. The quality data is for the component supplied to the company or service is provided for the company over a baseline time period. The quality data includes discrete quality data.

The apparatus includes a baseline module that determines a quality benchmark using the aggregated quality data from the aggregation module. The apparatus includes an alarm level module that sets one or more alarm levels. The alarm levels are based on the quality benchmark of the aggregated quality data. The apparatus includes a supplier quality module that determines a supplier quality level for the supplier for the supplier measurement time period. The supplier quality level is based on the supplier quality data. The apparatus includes an alarm module that determines if the supplier quality level exceeds an alarm level.

In one embodiment, the aggregated quality data and the supplier quality data include data for a component and include a number of components tested and a number of components within the tested components failing a quality test. The quality data is correlated to a time period or include data for a service provided by the supplier and include a quality score for the provided service. The quality score is for service provided by each supplier is based on a same scoring system. In another embodiment, the quality benchmark includes a ratio of a quantity of component failures to a quantity of components tested within the baseline time period for the aggregated quality data or an average score of service provided by the suppliers within the baseline time period. The average score is based on the aggregate quality data.

In one embodiment, the alarm module sets the one or more alarm levels by multiplying the quality benchmark by one or more alarm multipliers. Each alarm multiplier is associated with an alarm level. In another embodiment, the apparatus includes an alarm response module that initiates an alarm response in response to the alarm module determining that the supplier quality level exceeds a supplier alarm level. In another embodiment, the alarm response module initiates alarm responses of differing severity for each of two or more alarms where an alarm response of higher severity is associated with an alarm level further away from the quality benchmark and an alarm response of lower severity is associated with an alarm level closer to the quality benchmark than the alarm level with a higher severity alarm response.

A computer program product for determining supplier quality is included. The computer program product includes a computer readable storage medium having computer readable program code embodied therein. The computer readable program code is configured to receiving supplier quality data from a supplier. The supplier quality data includes discrete quality data. The supplier quality data is for a quantity of a component supplied to a company from the supplier over a supplier measurement period or a service provided on behalf of the company over a supplier measurement period.

The computer readable program code is configured to aggregate quality data from two or more suppliers. The quality data is for the component supplied to the company or service provided for the company over a baseline time period. The quality data includes discrete quality data. The computer readable program code is configured to determine a quality benchmark using the aggregated quality data and to set one or more alarm levels. The alarm levels are based on the quality benchmark of the aggregated quality data. The computer readable program code is configured to determine a supplier quality level for the supplier for the supplier measurement time period. The supplier quality level is based on the supplier quality data. The computer readable program code is configured to determine if the supplier quality level data exceeds an alarm level.

Another method determining supplier quality includes receiving supplier quality data from a supplier. The supplier quality data includes discrete quality data and the supplier quality data is for a quantity of a component supplied to a company from the supplier over a supplier measurement period. The method includes aggregating quality data from two or more suppliers by summing component failures of two or more suppliers over a baseline time period and summing a quantity of components tested by the two or more suppliers over the baseline time period. The quality data is for the component supplied to the company and the quality data includes discrete quality data. The method includes determining a quality benchmark using the aggregated quality data. The quality benchmark includes a ratio of a quantity of component failures to a quantity of components tested within the baseline time period for the aggregated quality data.

The method includes setting one or more alarm levels by multiplying the quality benchmark by one or more alarm multipliers. Each alarm multiplier is associated with an alarm level. The method includes determining a supplier quality level for the supplier for the supplier measurement time period by determining a ratio of a quantity of component failures to a quantity of components tested. The quantity of component failures and the quantity of components tested within in the supplier quality data are for the supplier measurement period. The method includes determining if the supplier quality level exceeds an alarm level.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a chart of one example of quality alarm levels and associated actions;

FIG. 7 is a table of one example of supplier quality data and alarm levels;

DETAILED DESCRIPTION OF THE INVENTION

Figure 1:
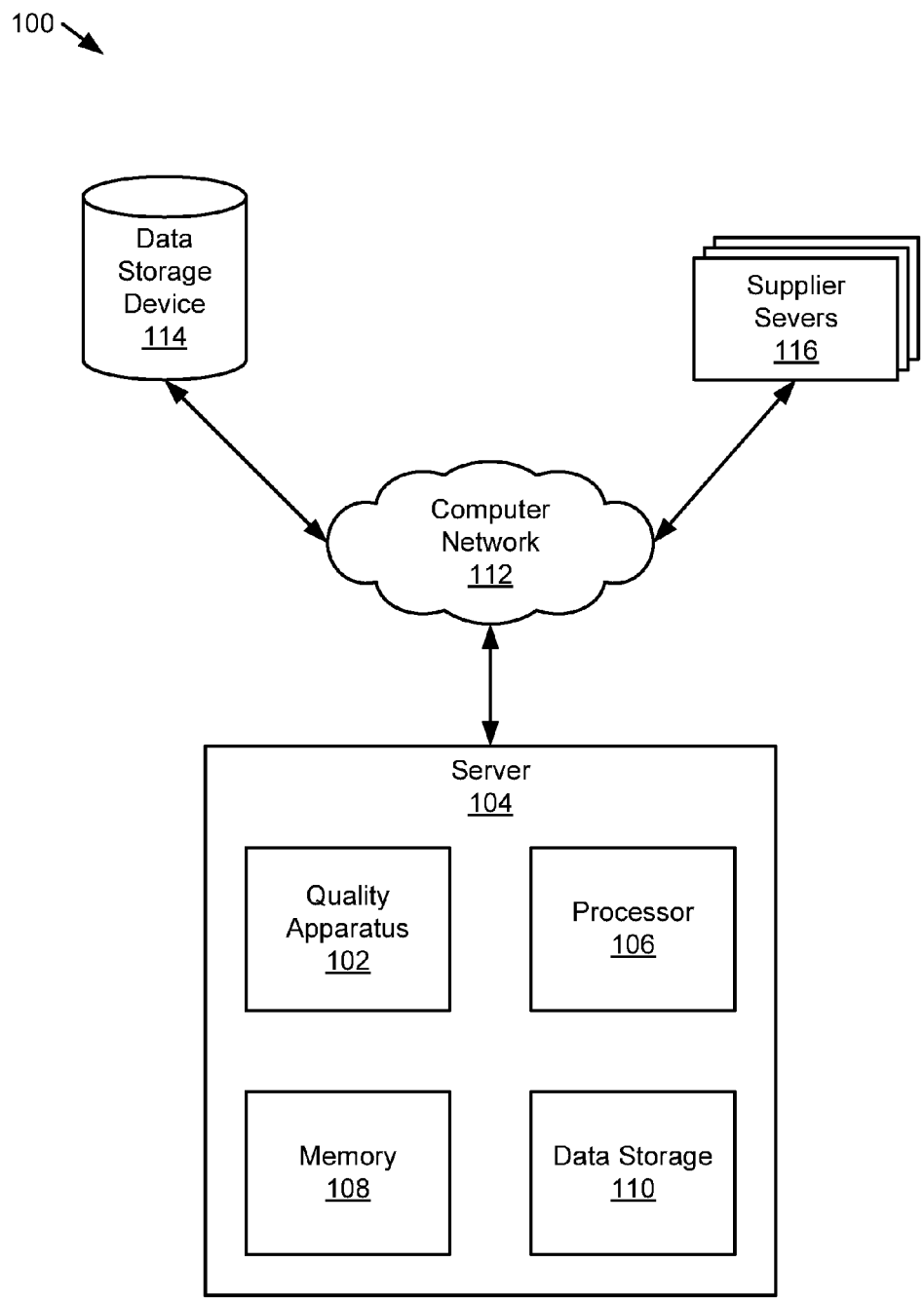
FIG. 1 is a schematic block diagram illustrating one embodiment of a system for determining quality.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Various embodiments described below relate to determining supplier quality for a component or for a service provided by a supplier to a company. Suppliers typically send quality data that is discrete data, such as a quantity of tested components and a quantity of components that failed quality testing. The supplier quality data is aggregated to determine a quality baseline. The aggregated data may be over some baseline time period while supplier quality data may be over different time periods, which may be shorter than the baseline time period. For example, the baseline time period may be a year and the suppliers may send quality data monthly or weekly.

Alarm levels are set based on the quality baseline and may be some scalar multiple of the quality baseline. For example if the quality baseline is X component failures per million then one alarm level may be set at 2×, so that if a supplier submits quality data indicating that over a month that component failure were over 2×, the company can take appropriate action. Multiple alarm levels may be set. For example, there can be alarm levels at 2×, 3×, 4×, etc. In other embodiments, an alarm level may be set at something like 1.573× or some other non-integer multiple. At each alarm level, the company may take different action so that more severe actions are taken at higher alarm levels.

FIG. 1 is a schematic block diagram illustrating one embodiment of a system 100 for determining quality. The system 100 includes a quality apparatus 102, a server, a processor 106, a memory 108, data storage 110, a computer network 112, a data storage device 114, and supplier servers 116, which are described below.

In one embodiment, the system 100 includes a quality apparatus 102 residing in a server 104. In other embodiments the quality apparatus 102 may be on a desktop computer, a laptop computer, on a workstation, and the like. The quality apparatus 102 may be on one device or may be distributed among multiple devices. The server 104 or other computing device that includes all or part of the quality apparatus 102 typically includes a processor 106, memory 108, and may include non-volatile data storage 110. In one embodiment, the server 104 connects to a computer network 112, which may be connected to one or more data storage devices 114 and to supplier servers 116 or other supplier computers. The quality apparatus 102 may be stored in data storage 110 that is part of the server 104 or other computer or may be stored on a remote data storage device 114. The remote data storage device 114 may be part of a storage area network ("SAN") and a portion of the computer network 112 may be part of the SAN.

The computer network 112 may be a single network or multiple networks. The computer network 112 may include a local area network ("LAN"), a wireless network, a wide area network ("WAN"), the internet, and the like. The computer network 112 may include servers, routers, switches, and the like. In one embodiment, suppliers may be connected to the server 104 through supplier servers 116 or other computing devices to enable the suppliers to provide supplier quality data. In other embodiments, supplier quality data may be sent by suppliers in other ways, such as on a data storage device such as a flash drive, diskette, compact disk ("CD"), mail or other convenient means.

Figure 2:
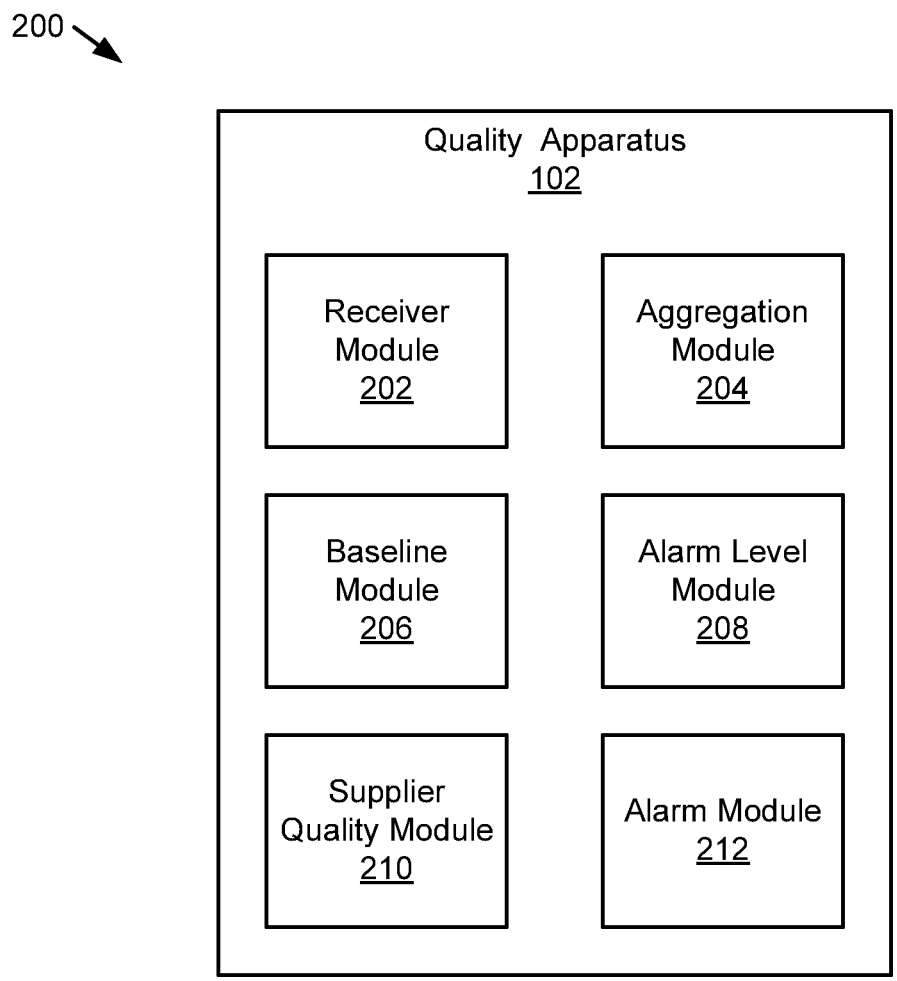
FIG. 2 is a schematic block diagram illustrating one embodiment of an apparatus for determining quality.

FIG. 2 is a schematic block diagram illustrating one embodiment of an apparatus 200 for determining quality. The apparatus 200 includes, in one embodiment, a quality apparatus 102 with a receiver module 202, an aggregation module 204, a baseline module 206, an alarm level module 208, a supplier quality module 210 and an alarm module 212, which are described below.

In one embodiment, the apparatus 200 includes a receiver module 202 that receives supplier quality data from a supplier. In one example, the supplier quality data may be for a quantity of a component supplied to a company from the supplier over a supplier measurement period. The component may be a part, an assembly, a unit, a device or other physical component provided by a supplier where quality data is gathered. For example, the component may be an integrated circuit ("IC") in chip form or other form. In another example, the component may be a video card. In another example, the component may be an entire computer. In another embodiment, the component may be valve.

A component may be divided into several categories or groups. The supplier quality data may be for a group within a component family. For example, a component may be a hard disk drive and the hard disk drives may be further divided by capacity. The supplier data may be for a hard disk drive that is 2 terabytes ("TB") where other supplier data may be for other hard disk drive capacities. Groups within a component category may be mutually exclusive or may be overlapping. For example, a group may be a particular version or batch of 2 TB hard disk drives or the supplier quality data may relate to hard disk drives of various capacities that are all of a same class or model. One of skill in the art will recognize other groups, sub-groups, and other ways to divide supplier quality data for a component.

In one embodiment, the supplier quality data relates to a service provided on behalf of the company over a supplier measurement period. For example, the supplier quality data may be a quality score. For example, a service may be scored from 1 to 10 and service provided by a supplier over the supplier measurement period may be a 5.3. A score for a service may be for one service or may be for multiple services provided by the supplier. The score may be determined by a quality assessment, by feedback from customers, from ratings provided by customers, by surveys, and the like. In one embodiment the supplier quality data includes multiple scores. In another embodiment, one or more scores may be scaled to match a particular scoring system. For example, if a supplier provides quality data on a scale from 1 to 5, the quality data may be adjusted to be on a scale from 1 to 10. One of skill in the art will recognize other ways to score a service and other forms of supplier quality data from a supplier for a service.

In one embodiment, the supplier quality data includes discrete quality data. For example, the supplier quality data may include number of component failures and number of component tested. In another embodiment, the supplier quality data may include quality data in the form of parts per million ("PPM") of failures or a percentage of good components provided by the supplier. In other embodiments, the supplier quality data may include data in the form of pass/fail, yield in percentage, and the like. One of skill in the art will recognize other forms of discrete data within supplier quality data.

The receiver module 202 may receive supplier quality data directly from the supplier, for example by way of a computer network 112, from a CD, from a website, or other electronic or physical means. In one embodiment, supplier quality data is converted from a paper form to an electronic form. One of skill in the art will recognize other ways for the receiver module 202 to receive supplier quality data.

In one embodiment, the apparatus 200 includes an aggregation module 204 that aggregates quality data from two or more suppliers. The quality data from the suppliers is for a component that is supplied to the company over a baseline time period or is for a service provided for the company over a baseline time period. Again the quality data includes discrete quality data. By aggregating data over a baseline time period from multiple suppliers, the aggregation module 204 may collect quality data sufficient to get a more complete picture of quality for a component than the supplier quality data from a single supplier.

In one embodiment, the aggregated quality data is for a component and include a number of components tested and a number of components within the tested components failing a quality test where the quality data correlates to a time period relevant to creation of the components. In one example, the aggregation module 204 aggregates quality data by summing component failures of the two or more suppliers over the baseline time period and by summing a quantity of components tested by the two or more suppliers over the baseline time period. The aggregation module 204 may also aggregate quality data by combining a ratio or percentage. For example, supplier quality data may come in the form of component failures expressed in parts per million. In this case, the aggregation module 204 may weight supplier quality data based on the number of components tested or the number of components supplied and then may combine the quality data so that the quality data is not skewed for a supplier that has supplied a large number of components relative to other suppliers. In another embodiment, the aggregation module 204 averages ratios and percentages ignoring quantities of components supplied or tested. One of skill in the art will recognize other ways that the aggregation module 204 may aggregate quality data over a baseline time period.

In another embodiment, the aggregated quality data include data for a service provided by the supplier and include a quality score for the provided service. The quality score may be for service provided by each supplier is based on a same scoring system. In one example, the aggregation module 204 aggregates the quality data by summing averages scores for a service provided by the two or more suppliers over the baseline time period and by dividing the sum by the number of suppliers. In another example, the aggregation module 204 aggregates the supplier quality data for a service by accounting for an amount of service provided for each supplier or an amount of time that the service is provided by each supplier. The aggregation module 204 may then weight the scores to determine an average score. One of skill in the art will recognize other ways that the aggregation module 204 may aggregate quality data for a service.

In one embodiment, the apparatus 200 includes a baseline module 206 that determines a quality benchmark using the aggregated quality data. For example, the baseline module 206 may determine a ratio of a quantity of component failures to a quantity of components tested within the baseline time period for the aggregated quality data and the ratio may be the quality benchmark. The baseline module 206 may use the sum of component failures in the baseline time period and the sum of components tested or supplied during the baseline time period. Where supplier quality data comes in the form of a ratio or percentage, the baseline module 206 may use a weighted average of the ratios or percentages as the quality benchmark.

The benchmark module 206 may include other considerations in determining a quality benchmark, such as known quality issues, quality data from a component that is very similar, or the like. For example, the benchmark module 206 may ignore certain supplier quality data or may minimize the effect of certain supplier quality data. For instance, if a supplier is just starting manufacture of a component and experiences an high number of failures to begin with, the baseline module 206 and/or aggregation module 204 may not include the supplier quality data until components from the new supplier meet a certain criteria. One of skill in the art will recognize other ways that the baseline module 206 and/or aggregation module 204 may determine a quality benchmark.

In one embodiment, determining a quality benchmark may be expressed as:

$$Q(G, T_B) = \sum \frac{F(G, T_B)}{I(G, T_B)}$$

Where:
Q=Quality level (percentage, PPM, etc.)
G=Group, sub-group within the components if any (provided by multiple suppliers) with common attributes. (If there are no groups then the quality data is for the component.)
$T_B$=Baseline time period (e.g. year, quarter, month, week)
F—Quantity of failures experienced in a component or component group (e.g. part number) over time ($T_B$)
I=Quantity of components tested, installed, provided, etc. over time ($T_B$). The quantity of failures is based on this quantity.

In this embodiment, the quality baseline is a summation of the quantity of failures for a particular group within a component divided by a summation of the components within the group that is used as the basis for the failures. If Supplier 1 tests $X_1$ components and determines that $Y_1$ components failed and Supplier 2 tests $X_2$ components and determines that $Y_2$ components failed, and so on through Supplier n, then in one embodiment the quality benchmark would be:

$$Q(G, T_B) = \frac{Y_1 + Y_2 + \ldots + Y_n}{X_1 + X_2 + \ldots + X_n}$$

In one embodiment, the quantity of components tested is equal to a number of components that have been installed, for example installed in a computer by the supplier. In another embodiment, the quantity of components supplied by a supplier is related to the quantity of components tested. For example, the quantity of components supplied may be the quantity of components tested less failed components. In a situation where a supplier provides a quantity of failures and then provides a quantity of components, a company receiving the components may deduce the quantity of components tested. In another embodiment, a quantity of components that fail may be small so a quantity of components tested may be nearly equal to a quantity of components supplied so using a quantity of components supplied may not significantly alter a quality benchmark. One of skill in the art will recognize an appropriate baseline number of components for determining a quality benchmark or a supplier quality level.

In one embodiment, the apparatus 200 includes an alarm level module 208 that sets one or more alarm levels. The alarm levels are based on the quality benchmark of the aggregated quality data. In one embodiment, an alarm level is created by multiplying the quality benchmark by an alarm multiplier. For example:

$$A(L, G, T_B) = M(L) \cdot Q(G, T_B)$$

A=Quality alarm level
M=Alarm multiplier for an alarm index
L=Alarm index (severity). In one embodiment, L=1, 2, ... 1
Q=Quality level (percentage, PPM, etc.)
G=Group, sub-group within the components if any (provided by multiple suppliers) with common attributes. (If there are no groups then the quality data is for the component.)
$T_B$=Baseline time period (e.g. year, quarter, month, week)

The alarm multiplier M may be an integer, such as 1, 2, 3, etc. or may be a real number, such as 1.5, 3.7, etc. For example, a first alarm multiplier M(1) may be 1.5, a second alarm multiplier M(2) may be 3, a third alarm multiplier M(3) may be 3.7, etc. In one embodiment, each alarm level and each corresponding alarm multiplier M may be chosen to correspond to some appropriate action to be taken in case quality data exceeds an alarm level.

In other embodiments, the alarm level module 208 sets alarm levels that are more complex than simple multipliers. For example, an alarm level may be related to a rate of increase of failures. In another example, an alarm level may be relative and may be related to a certain increase in failures. For example, if a quality benchmark is 12 PPM failures and a first alarm is set to 18 PPM failures and if supplier quality data indicates 5 PPM failures in a month and a relative alarm level is set so that if supplier quality data indicates a 2× increase in failures, if the next month the supplier quality data indicates an increase from 5 PPM failures to 11 PPM failures then this relative alarm level may be triggered even though the first alarm level of 18 PPM failures has not been triggered. One of skill in the art will recognize other ways for the alarm level module 208 to set alarm levels.

In one embodiment, the apparatus 200 includes a supplier quality module 210 that determines a supplier quality level for the supplier for the supplier measurement time period where the supplier quality level is based on the supplier quality data. In one embodiment, the supplier quality module 210 uses supplier quality data received by the receiver module 202 to determine a supplier quality level. For example, if the baseline time period is one year, a supplier may supply quality data monthly and the supplier quality module 210 may determine a supplier quality level for the components or service provided during a particular month. Typically, the supplier quality module 210 uses the same methodology for determining a supplier quality level as the baseline module 206 uses to determine a quality benchmark so that the supplier quality level is related to the quality benchmark. A supplier quality level may be expressed as:

$$Q(S, G, T_M) = \sum \frac{F(S, G, T_M)}{I(S, G, T_M)}$$

Where:
Q=Quality level (percentage, PPM, etc.)
S=Supplier
G=Group, sub-group within the components if any (provided by multiple suppliers) with common attributes. (If there are no groups then the quality data is for the component.)

$T_M$=Time period of measurement of supplier quality data (e.g. quarter, month, week, day)
F—Quantity of failures experienced in a component or component group (e.g. part number) over time ($T_B$)
I=Quantity of components tested, installed, provided, etc. over time ($T_B$). The quantity of failures is based on this quantity.

In one embodiment, the apparatus 200 includes an alarm module 212 that determines if the supplier quality level exceeds an alarm level. For example, the alarm module 212 may determine that a supplier quality level determined by the supplier quality module 210 exceeds an alarm level set by the alarm level module 208. For example, if the supplier quality module 210 determines that a supplier quality level is 15 PPM and the alarm level module 208 has set an alarm level at 12 PPM, the alarm module 212 determines that the supplier quality level is above the alarm level. The apparatus 200 may then take appropriate action.

Figure 3:
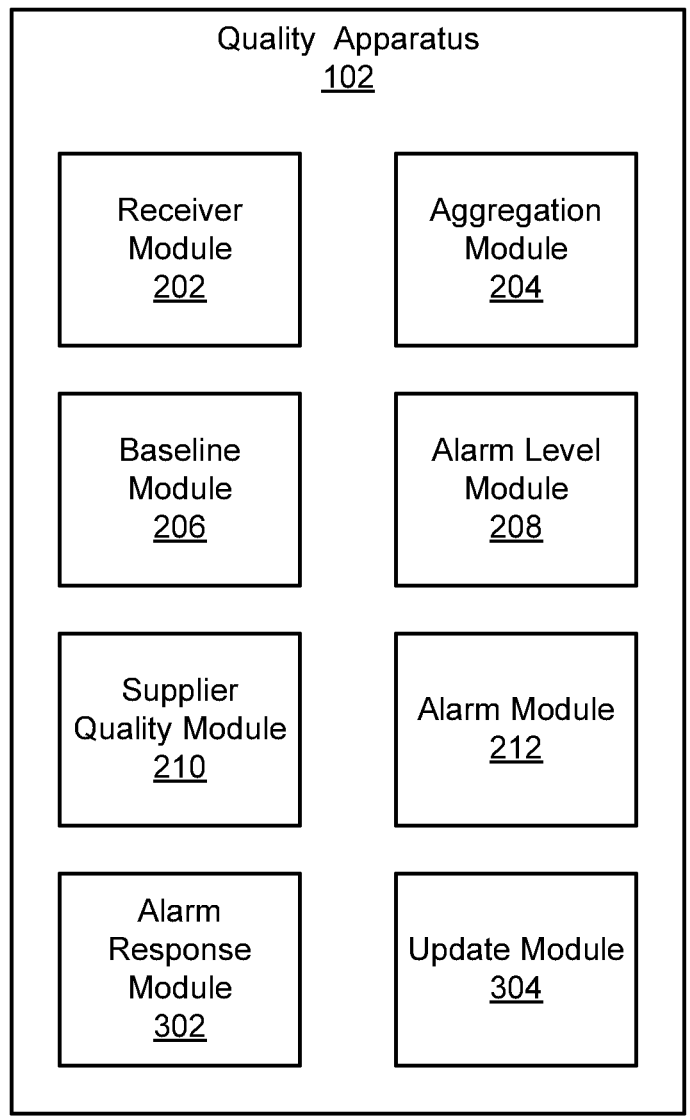
FIG. 3 is a schematic block diagram illustrating another embodiment of an apparatus for determining quality.

FIG. 3 is a schematic block diagram illustrating another embodiment of an apparatus 300 for determining quality. The apparatus 300 includes, in one embodiment, a quality apparatus 102 with a receiver module 202, an aggregation module 204, a baseline module 206, an alarm level module 208, a supplier quality module 210 and an alarm module 212, which are substantially similar to those described in relation to the apparatus 200 of FIG. 2. The quality apparatus 102 may also include an alarm response module 302 and/or an update module 304, which are described below.

In one embodiment, the apparatus 300 includes an alarm response module 302 that initiates an alarm response in response to the alarm module 212 determining that the supplier quality level exceeds a supplier alarm level. Typically the alarm response is appropriate to the alarm level. Where the alarm level module 208 sets multiple alarm levels, each alarm level may trigger a different response. The alarm response module 302 may initiate responses of differing severity for each alarm level. Typically an alarm response of higher severity is associated with an alarm level further away from the quality benchmark and an alarm response of lower severity is associated with an alarm level closer to the quality benchmark than the alarm level with a higher severity alarm response.

For example, the alarm level module 208 may set alarm levels at 2×, 3×, and 5× the quality benchmark and the alarm response module 302 may initiate low level actions for the 2× alarm level. For example, the alarm response module 302 may simply send out notifications to the supplier and to the quality team of the company. For the 3× alarm level, the alarm response module 302 may send notifications and may also send additional notifications to management and may require some action or accountability. For the 5× alarm level, the alarm response module 302 may send notifications, may require action, and may suspend use of parts from the supplier. One of skill in the art will recognize other actions that the alarm response module 302 may take based on the alarm module 212 determining that supplier quality level exceeds an alarm level.

In one embodiment, the apparatus 300 includes an update module 304 that adds supplier quality data to the aggregated quality data to get updated aggregated quality data, determines an updated quality benchmark using the updated aggregated quality data, and sets one or more alarm levels based on the updated quality benchmark. The update module 304 may act in conjunction with the receiver module 202, the aggregation module 204, the baseline module 206, the alarm level module 208, the supplier quality module 210, and other modules.

In time the suppliers provide components and services along with supplier quality data received by the receiver module 202. The update module 304 includes new quality data with the aggregated quality data so that an updated quality benchmark is created and the alarm levels are updated by the update module 304 and other modules. The apparatus 300 may also track quality benchmark data to determine trends in quality for a component or service.

Figure 4:
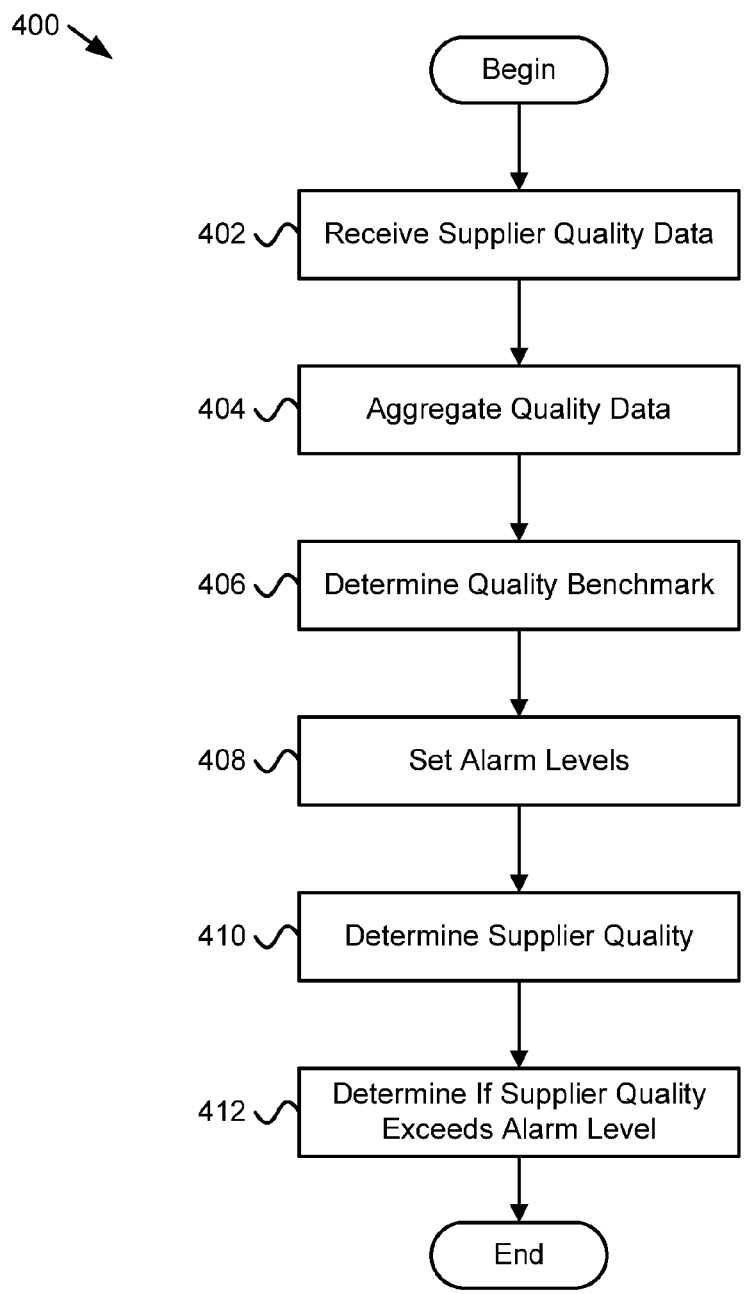
FIG. 4 is a schematic flow chart diagram illustrating one embodiment of a method for determining quality.

FIG. 4 is a schematic flow chart diagram illustrating one embodiment of a method 400 for determining quality. The method 400 begins and the receiver module 202 receives 402 supplier quality data from a supplier. The supplier quality data includes discrete quality data, such as number of failures and number of components tested, or a score for a service provided by the supplier. In one embodiment, the receiver module 202 receives 402 supplier quality data from more than one supplier. The aggregation module 204 aggregates 404 the supplier quality data. The aggregation module 204 may sum quantities of failures, may sum number of components tested, may gather scores, or any other activity associated with gathering and combining quality data from suppliers. The aggregation module 204 aggregates 404 data over a baseline time period.

The baseline module 206 determines 406 a quality benchmark based the aggregated supplier quality data. For example, the baseline module 206 may divide summed failures by summed tested components, may determine an average, or other process to determine 406 a quality benchmark from aggregated quality data. The alarm level module 208 sets 408 alarm levels based on the quality benchmark for the aggregated quality data. The alarm level module 208 may set 408 one or more alarm levels by multiplying the quality benchmark by an alarm multiplier. The alarm level module 208 may set 408 multiple alarm levels to represent multiple levels of severity of quality issues. The alarm level module 208 may also set 408 alarm levels that are different than multiples of the quality benchmark. For example, the alarm level module 208 may set 408 an alarm level based on a rate of failure increase, may set 408 a relative alarm level, etc.

The supplier quality module 210 determines 410 a supplier quality level for the supplier for the supplier measurement time period. The supplier quality level is based on the supplier quality data received 402 by the receiver module 202. For example, the supplier quality module 210 may calculate a supplier quality level from the supplier quality data or may manipulate supplier quality information to be on a same scale as the quality benchmark. The alarm module 212 determines 412 if the supplier quality level exceeds an alarm level and the method 400 ends. For example, if the alarm level module 208 sets 408 three alarm levels, the alarm module 212 determines 412 if the supplier quality level exceeds one or more of the three alarm levels.

Figure 5:
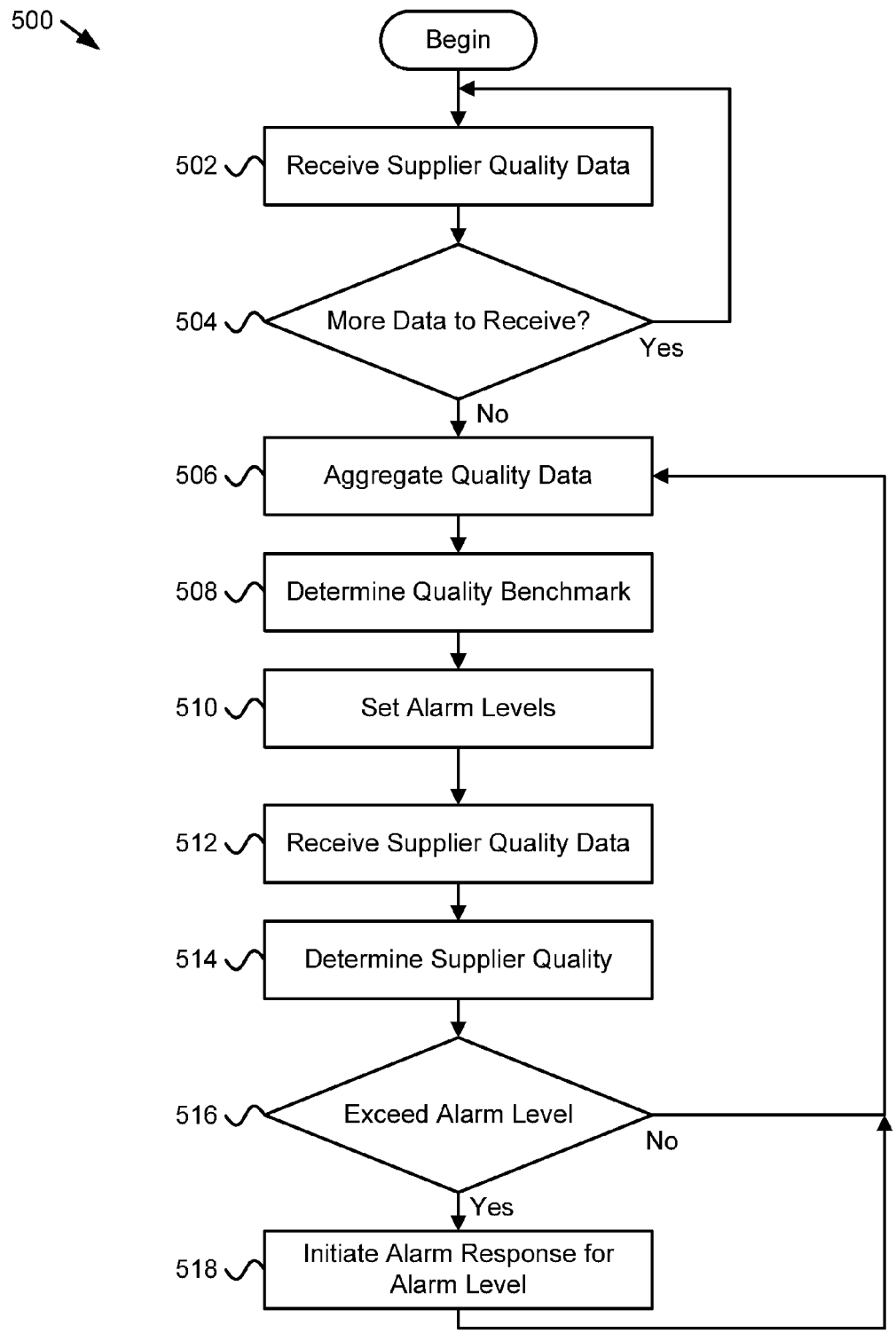
FIG. 5 is a schematic flow chart diagram illustrating another embodiment of a method for determining quality.

FIG. 5 is a schematic flow chart diagram illustrating another embodiment of a method 500 for determining quality. The method 500 begins and the receiver module 202 receives 502 supplier quality data. The aggregation module 204 determines 504 if there is more data to receive. In another embodiment, the receiver module 202 determines 504 if there is more data to receive. If the aggregation module 504 determines 504 that there is more supplier quality data to receive, the receiver module 202 receives 502 the additional supplier quality data and aggregation module 204 includes the additional supplier quality data with the previously gathered quality data. If the aggregation module 504 determines 504 that there is not more supplier quality data to receive, the aggregation module 204 aggregates 506 the quality data.

The baseline module 206 determines 508 a quality benchmark based on the aggregated supplier quality data. The alarm level module 208 sets 510 one or more alarm levels based on the quality benchmark for the aggregated quality data. In one embodiment, steps 502 to 510 are executed initially to first determine a quality benchmark.

In one example, the receiver module 202 receives 512 additional supplier quality data and the supplier quality module 210 determines 514 a supplier quality level from the supplier quality data. In another example, data received 502 previously by the receiver module 202 is examined. The alarm module 212 determines 516 if the supplier quality level exceeds an alarm level. This quality data may be additional supplier quality data or part of the quality data used to determine an initial quality benchmark. If the alarm module 212 determines 516 that the supplier quality level exceeds an alarm level, the alarm response module 302 initiates 518 an alarm response for the exceeded alarm level and the update module 304/aggregation module 204 return and aggregate 506 the additional supplier quality data with the current aggregated quality data. If the alarm module 212 determines 516 that the supplier quality level does not exceed an alarm level, the update module 304/aggregation module 204 return and aggregate 506 the additional supplier quality data with the current aggregated quality data. The method 500 may repeat the process each time quality data is received from a supplier.

FIG. 6 is a chart of one example 600 of quality alarm levels and associated actions. The example 600 includes an alarm level 1, which is a target quality level, an alarm level 2, which is a limit, and an alarm level 3, which is an alert. The definition line indicates that the definition of an alarm level 1 is the "baseline $Q(Q, T_B)$, which is the quality benchmark. For alarm level 2, the alarm level is two times the quality benchmark. For alarm level 3, the alarm level is three times the quality benchmark.

The trigger timing for the owner of the task, which is the supplier quality engineer ("SQE") under alarm level 1, is a monthly quality management system ("QMS") refresh initiated by the SQE, so that it is the responsibility of the SQE to review data from the supplier. The quality apparatus 102 may generate the alarm level 1. The same is true for the alarm level 2 and alarm level 3. The SQE, in one embodiment, is a quality engineer employed by the company and assigned to the supplier. The example 600 indicates that for alarm level 1, the over-target action for the supplier owner is to send to the supplier and ask for improvement. For an alarm level 1, the trigger may be that the supplier quality level is over the quality benchmark. In another embodiment, the trigger for an alarm level 1 may be that the supplier did not send monthly supplier quality data. In one embodiment, the supplier owner is from the company and works with the supplier to achieve quality compliance. For alarm level 1 the over-target action for the department over the component or service of the company receiving the component or service is a monthly team review. For alarm level 1 the over-target action for the management and for the quality team of the company receiving the component or service is to do nothing.

For alarm level 2 (i.e. if the supplier quality level exceeds alarm level 2), the over target action for the supplier owner is to send alert information to the supplier and require a response within one week from the supplier. In another embodiment, the alarm response module 302 sends the alert information. The over-target action for the department over the component or service of the company receiving the component or service is a bi-monthly team review. For alarm level 2 the over-target action for the management is monthly management review and the over-target action for the quality team of the company receiving the component or service is a monthly shipped part quality level ("SPQL") report line item for high volume shipments and a weekly status update which may be verbal as required.

For alarm level 3 (i.e. if the supplier quality level exceeds alarm level 3), the over target action for the supplier owner is to send alert information to the supplier and require a response within one day from the supplier. In another embodiment, the alarm response module 302 sends the alert information. The over-target action for the department is daily team review as required. For alarm level 3 the over-target action for the management is weekly management review with presentation plus additional updates as required. The over-target action for the quality team is a monthly SPQL report as a presentation for a high volume of shipped parts and a weekly status update as a line item. The alarm response module 302 may include information from the example 600 to initiate a response. Note that the example 600 is one way to implement actions required for a supplier quality level exceeding an alarm level. One of skill in the art will recognize other ways to initiate a response to exceeding an alarm level.

FIG. 7 is a table 700 of one example of supplier quality data and alarm levels. The table 700 includes a month column which indicates a month of the year that components were supplied. The table 700 includes a supplier column identifying a supplier and a density column indicating density of memory (i.e. 4G=4 gigabytes, 2G=2 gigabytes, 1G=1 gigabyte, and 512M=512 megabytes). The table 700 includes a usage column with quantity of memory cards used or tested and a fails column indicating a number of components in the usage column that failed. The table 700 includes a PPM column which is the fails data and usage data converted to PPM. For example, in the first row of data if there are 7 failures in 4,965 used cards then dividing 7 by 4,965 equals 0.001409869 or 1,410 PPM.

The target L2 column is a first alarm level and the target L3 column is a second alarm level, both on a PPM basis. The table 700 includes a performance column where performance is given a "1," "2," or "3." A "1" is for a supplier quality level that does not exceed target L2, a "2" is for a supplier quality level exceeding target L2 but not target L3, and a "3" is for a supplier quality level exceeding target L3. For example, in the first row, in month 7 supplier B provided 4G memory cards with a supplier quality level of 1410 PPM, which exceeds target L2 but not target L3 so the performance is a "2." In the second row, in month 7 supplier C provided 2G memory cards with a supplier quality level of 1,576 which exceeds target L3 so the supplier warrants a performance of 3.

The table 700 includes a volume column that indicates a volume of components provided or tested by the supplier. For example, in the first row supplier B produced 4G memory cards at a mid volume rate and in month 4 ($8^{th}$ row) supplier B produced 4G memory cards at a high volume rate. The table 700 may be associated with the aggregation module 202 that may sum the fails and usage columns for a particular group (e.g. 4G, 2G, etc.) or may be produced by the alarm module 212 to indicate performance that exceeds an alarm level. One of skill in the art will recognize how to use the quality apparatus 102 to produce tables and other useful data to determine supplier quality levels.

Figure 8:
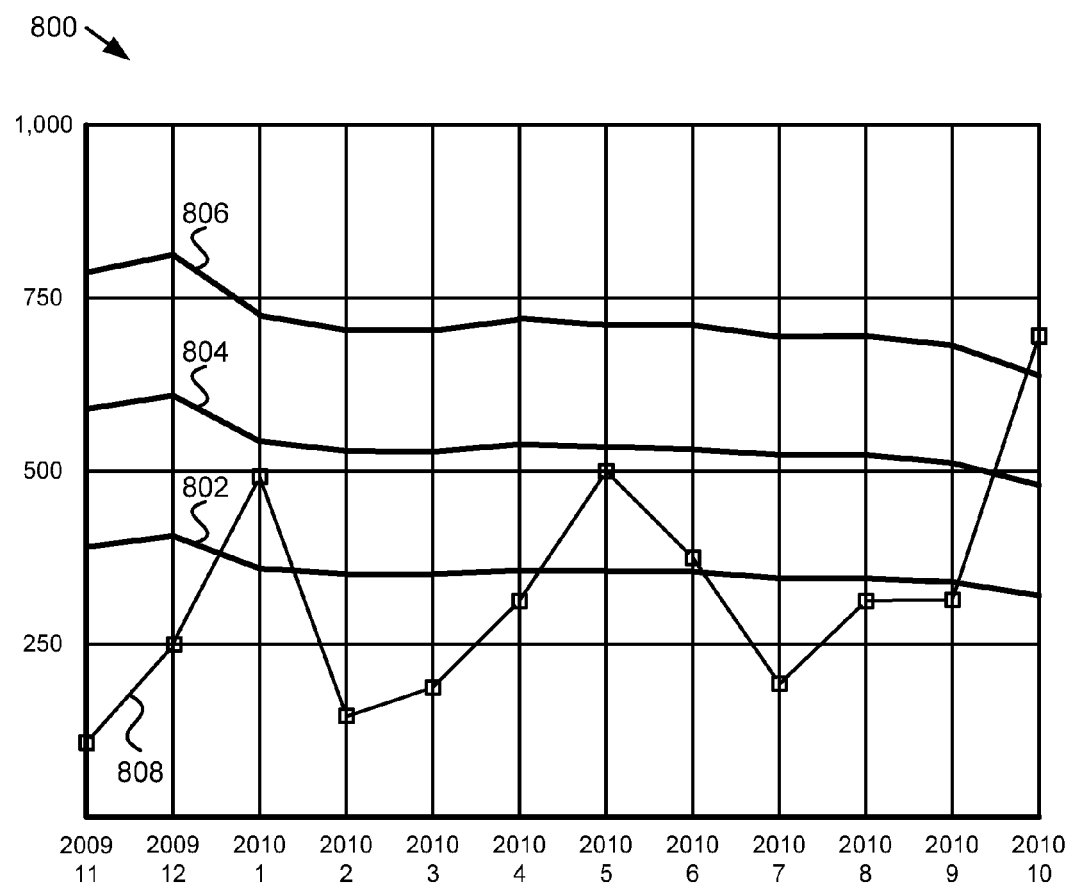
FIG. 8 is a graph showing alarm levels and supplier quality data over a year.

FIG. 8 is a graph 800 showing alarm levels and supplier quality levels over a year. The graph 800 is for International Business Machines' ("IBM") System X manufacturing quality for memory for supplier B's technology family "b" from November 2009 to October 2010. The graph 800 includes a target level 802, which in one embodiment, is the quality benchmark. The target level 802 may correlate to the alarm level 1-target in the example 600 in FIG. 6. Note that the target level 802 changes over time, which is indicative of supplier quality changing over time. The graph 800 includes a limit level 804, which may correlate the alarm level 2-limit in the example 600 in FIG. 6. The graph 800 also includes an alert level 806, which may correlate to the alarm level 3-alert in the example 600 of FIG. 6. Note that the limit level 804 and the alert level 806 track the target level 802 where the limit level 804 and the alert level 806 are the target level 802 multiplied by an alarm multiplier.

The graph 800 also includes a supplier quality level 808 over the time period. The supplier quality level 808 exceeds the target level 802 in January 2010, May 2010, and June 2010 and exceeds the alert level 806 in October 2010. The alarm module 212 may generate the graph 800 and the alarm response module 302 may initiate an alarm response in the months where the supplier quality level exceeds the target level 802 and alert level 806. The alarm response module 302 may initiate responses similar to those in the example 600 of FIG. 6.

Figure 9:
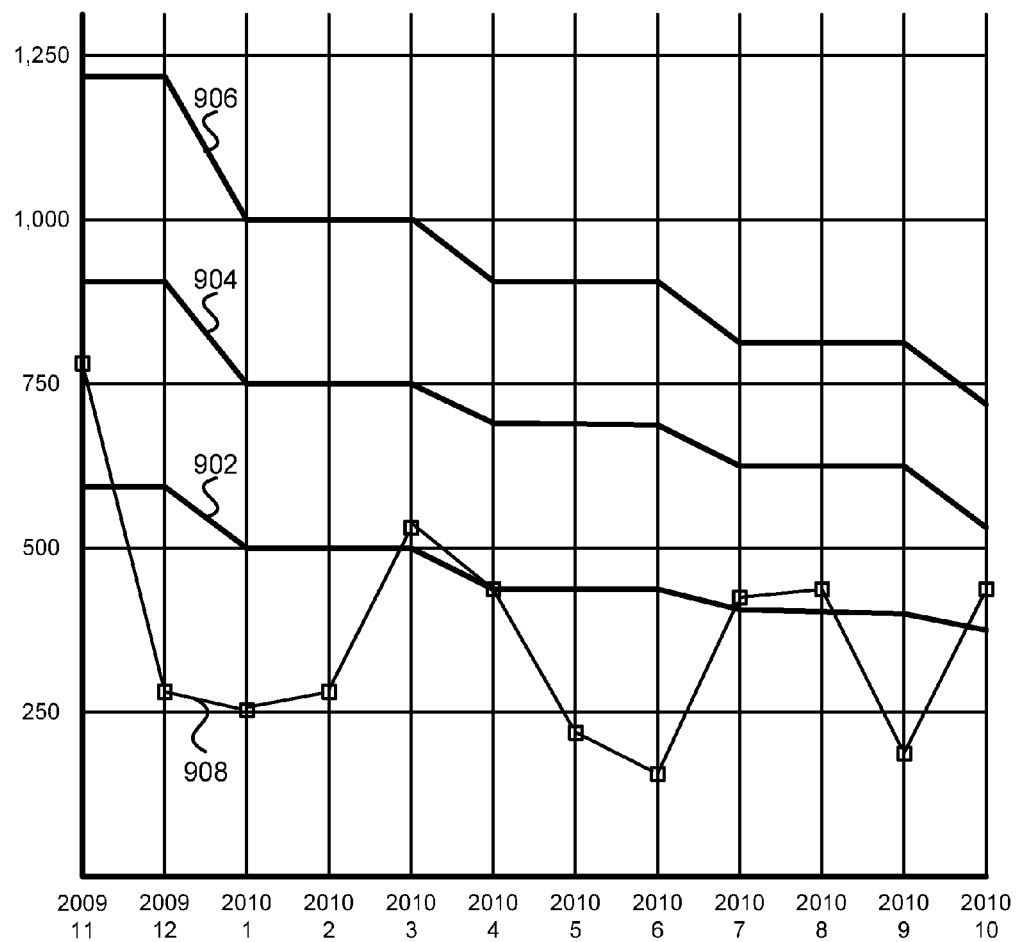
FIG. 9 is another graph showing alarm levels and supplier quality data over a year.

FIG. 9 is another graph 900 showing alarm levels and supplier quality levels over a year. The graph 900 is for International Business Machines' System X manufacturing quality for dynamic read only memory ("DRAM") for IBM's part number 43X5044 from November 2009 to October 2010. The graph 900 includes a target level 902, which in one embodiment, is the quality benchmark. The target level 902 may correlate to the alarm level 1-target in the example 600 in FIG. 6. The graph 900 includes a limit level 904, which may correlate the alarm level 2-limit in the example 600 in FIG. 6. The graph 900 also includes an alert level 906, which may correlate to the alarm level 3-alert in the example 600 of FIG. 6. Note that again the limit level 904 and the alert level 906 track the target level 902 where the limit level 904 and the alert level 906 are multiplied by an alarm multiplier.

The graph 900 includes a supplier quality level 908. The supplier quality level 908 exceeds the target level 802 in November 2009, March 2010, July 2010, August 2010, and October 2010. The alarm response module 302 may take appropriate action for the months where the supplier quality level 908 exceeds the target level 902.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving supplier quality data, the supplier quality data comprising discrete quality data, the supplier quality data for one of
a quantity of a component supplied to a company over a supplier measurement period; and
a service provided on behalf of the company over a supplier measurement period, wherein the service is provided to one or more of
the company; and
a customer;
wherein the supplier quality data comprises information regarding quality of the component supplied to the company or the service provided on behalf of the company;
aggregating quality data received from two or more suppliers, the quality data for the component supplied to the company or service provided for the company over a baseline time period, the quality data comprising discrete quality data, wherein aggregating the quality data comprises one of summing component failures of two or more suppliers over a baseline time period and summing a quantity of components tested by the two or more suppliers over the baseline time period, and summing averages scores for a service provided by the two or more suppliers over the baseline time period and dividing the sum by the number of suppliers;

determining a quality benchmark using the aggregated quality data, wherein the quality benchmark comprises one of a ratio of a quantity of component failures to a quantity of components tested within the baseline time period for the aggregated quality data; and an average score of the service within the baseline time period, the average score based on the aggregate quality data;

setting one or more alarm levels, by multiplying the quality benchmark of the aggregated quality data by one or more alarm multipliers, wherein each alarm multiplier is associated with an alarm level, wherein each alarm level is associated with a different level of severity of a quality issue, wherein the alarm multiplier is based on the level of severity of the quality issue, the level of severity being based on how close the alarm level is to the quality benchmark;

determining a supplier quality level for the supplier measurement time period, the supplier quality level based on the supplier quality data;

determining if the supplier quality level exceeds an alarm level; and initiating an alarm response in response to determining that the supplier quality level exceeds an alarm level, each alarm response appropriate for a level of severity of the alarm level exceeded by the supplier quality level.

2. The method of claim 1, wherein the aggregated quality data and the supplier quality data comprise data for a component and comprise a number of components tested and a number of components within the tested components failing a quality test, the quality data correlated to a time period relevant to creation of the components.

3. The method of claim 1, wherein the aggregated quality data and the supplier quality data comprise data for a service provided by a supplier and comprise a quality score for the provided service, wherein the quality score for service provided by each supplier is based on a same scoring system.

4. The method of claim 1, wherein the supplier quality data and the aggregated quality data comprise data for a group, the group comprising a subclass of a class comprising the component or service, and wherein the quality benchmark, the one or more alarm levels, and the one or more supplier alarm levels are based on quality data for the group.

5. The method of claim 1, wherein determining a supplier quality level comprises determining a ratio of a quantity of component failures to a quantity of components tested, the quantity of component failures and the quantity of components tested within in the supplier quality data for the supplier measurement period.

6. The method of claim 1, wherein the one or more supplier alarms comprise two or more alarms set at differing levels from the quality benchmark and wherein the alarm response module initiates alarm responses of differing severity for each of the two or more alarms, wherein an alarm response of higher severity is associated with an alarm level further away from the quality benchmark and an alarm response of lower severity is associated with an alarm level closer to the quality benchmark than the alarm level with a higher severity alarm response.

7. The method of claim 1, further comprising:

adding supplier quality data to the aggregated quality data to get updated aggregated quality data;

determining an updated quality benchmark using the updated aggregated quality data; and setting one or more alarm levels based on the updated quality benchmark.

8. An apparatus comprising:

a receiver module that receives supplier quality data, the supplier quality data comprising discrete quality data, the supplier quality data for one of a quantity of a component supplied to a company over a supplier measurement period; and a service provided on behalf of the company over a supplier measurement period, wherein the service is provided to one or more of the company; and a customer;

wherein the supplier quality data comprises information regarding quality of the component supplied to the company or the service provided on behalf of the company;

an aggregation module that aggregates quality data received from two or more suppliers, the quality data for the component supplied to the company or service provided for the company over a baseline time period, the quality data comprising discrete quality data, wherein aggregating the quality data comprises one of summing component failures of two or more suppliers over a baseline time period and summing a quantity of components tested by the two or more suppliers over the baseline time period, and summing averages scores for a service provided by the two or more suppliers over the baseline time period and dividing the sum by the number of suppliers;

a baseline module that calculates a quality benchmark using the aggregated quality data from the aggregation module, wherein the quality benchmark comprises one of a ratio of a quantity of component failures to a quantity of components tested within the baseline time period for the aggregated quality data; and an average score of service provided by the suppliers within the baseline time period, the average score based on the aggregate quality data;

an alarm level module that sets one or more alarm levels by multiplying the quality benchmark of the aggregated quality data by one or more alarm multipliers, wherein each alarm multiplier is associated with an alarm level, wherein each alarm level is associated with a different level of severity of a quality issue, wherein the alarm multiplier is based on the level of severity of the quality issue, the level of severity being based on how close the alarm level is to the quality benchmark;

a supplier quality module that determines a supplier quality level for the supplier measurement time period, the supplier quality level based on the supplier quality data;

an alarm module that determines if the supplier quality level exceeds an alarm level; and an alarm response module that initiates an alarm response in response to the alarm module determining that the supplier quality level exceeds an alarm level, each alarm response appropriate for a level of severity of the alarm level exceeded by the supplier quality level.

9. The apparatus of claim 8, wherein the aggregated quality data and the supplier quality data comprise one of
 data for a component and comprise a number of components tested and a number of components within the tested components failing a quality test, the quality data correlated to a time period; and
 data for a service provided by a supplier and comprise a quality score for the provided service, wherein the quality score for service provided by each supplier is based on a same scoring system.

10. The apparatus of claim 8, wherein the alarm response module initiates alarm responses of differing severity for each of two or more alarms wherein an alarm response of higher severity is associated with an alarm level further away from the quality benchmark and an alarm response of lower severity is associated with an alarm level closer to the quality benchmark than the alarm level with a higher severity alarm response.

11. A computer program product for determining supplier quality, the computer program product comprising a non-transitory computer readable storage medium having computer readable program code embodied therein, the computer readable program code configured to:
 receive supplier quality data, the supplier quality data comprising discrete quality data, the supplier quality data for one of
  a quantity of a component supplied to a company over a supplier measurement period; and
  a service provided on behalf of the company over a supplier measurement period, wherein the service is provided to one or more of
   the company; and
   a customer;
  wherein the supplier quality data comprises information regarding quality of the component supplied to the company or the service provided on behalf of the company;
 aggregate quality data received from two or more suppliers, the quality data for the component supplied to the company or service provided for the company over a baseline time period, the quality data comprising discrete quality data, wherein aggregating the quality data comprises one of
  summing component failures of two or more suppliers over a baseline time period and summing a quantity of components tested by the two or more suppliers over the baseline time period, and
  summing averages scores for a service provided by the two or more suppliers over the baseline time period and dividing the sum by the number of suppliers;
 calculate a quality benchmark using the aggregated quality data, wherein the quality benchmark comprises one of
  a ratio of a quantity of component failures to a quantity of components tested within the baseline time period for the aggregated quality data; and
  an average score of service provided by the suppliers within the baseline time period, the average score based on the aggregate quality data;
 set one or more alarm levels, the alarm levels by multiplying the quality benchmark of the aggregated quality data by one or more alarm multipliers, wherein each alarm multiplier is associated with an alarm level, wherein each alarm level is associated with a different level of severity of a quality issue, wherein the alarm multiplier is based on the level of severity of the quality issue, the level of severity being based on how close the alarm level is to the quality benchmark;
 determine a supplier quality level for the supplier measurement time period, the supplier quality level based on the supplier quality data;
 determine if the supplier quality level exceeds an alarm level; and
 initiate an alarm response in response to determining that the supplier quality level exceeds an alarm level, each alarm response appropriate for a level of severity of the alarm level exceeded by the supplier quality level.

12. A method comprising:
 receiving supplier quality data, the supplier quality data comprising discrete quality data, the supplier quality data for a quantity of a component supplied to a company over a supplier measurement period, wherein the service is provided to one or more of
  the company; and
  a customer
  wherein the supplier quality data comprises information regarding the quality of the component supplied to the company or the service provided on behalf of the company;
 aggregating quality data received from two or more suppliers by summing component failures of two or more suppliers over a baseline time period and summing a quantity of components tested by the two or more suppliers over the baseline time period, the quality data for the component supplied to the company, the quality data comprising discrete quality data;
 determining a quality benchmark using the aggregated quality data, the quality benchmark comprising a ratio of a quantity of component failures to a quantity of components tested within the baseline time period for the aggregated quality data;
 setting one or more alarm levels by multiplying the quality benchmark by one or more alarm multipliers, wherein each alarm multiplier is associated with an alarm level, wherein each alarm level is associated with a different level of severity of a quality issue, wherein the alarm multiplier is based on the level of severity of the quality issue, the level of severity being based on how close the alarm level is to the quality benchmark;
 determining a supplier quality level for the supplier measurement time period by determining a ratio of a quantity of component failures to a quantity of components tested, the quantity of component failures and the quantity of components tested within in the supplier quality data for the supplier measurement period;
 determining if the supplier quality level exceeds an alarm level; and
 initiating an alarm response in response to determining that the supplier quality level exceeds an alarm level, each alarm response appropriate for a level of severity of the alarm level exceeded by the supplier quality level.

* * * * *